(12) United States Patent
Lenhart et al.

(10) Patent No.: US 12,399,041 B2
(45) Date of Patent: Aug. 26, 2025

(54) WAVE-BASED SENSOR SYSTEM AND SENSOR SIGNAL CORRECTION METHOD

(71) Applicant: Rohde & Schwarz GmbH & Co. KG, Munich (DE)

(72) Inventors: Bjoern Lenhart, Munich (DE); Julian Adametz, Munich (DE); Georg Schnattinger, Munich (DE); Andreas Schiessl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 358 days.

(21) Appl. No.: 18/298,899

(22) Filed: Apr. 11, 2023

(65) Prior Publication Data

US 2024/0344855 A1 Oct. 17, 2024

(51) Int. Cl.
*G01D 5/48* (2006.01)
*G01D 5/244* (2006.01)
(Continued)

(52) U.S. Cl.
CPC ............ *G01D 5/48* (2013.01); *G01D 5/24476* (2013.01); *G01N 29/06* (2013.01); *G01S 7/0232* (2021.05);
(Continued)

(58) Field of Classification Search
CPC ........ G01D 5/48; G01D 5/24476; G01N 29/06; G01S 7/0232; G01S 7/0235; G01S 7/36; G01S 7/4004; G01S 7/497; G01S 13/887; G01S 13/89; G01S 17/89; G01V 3/08; G01V 5/20
See application file for complete search history.

(56) References Cited

U.S. PATENT DOCUMENTS 5,699,151 A * 12/1997 Akasu .................... G01S 7/497
356/5.01
9,791,551 B1 * 10/2017 Eshraghi ................ G01S 7/038
(Continued)

FOREIGN PATENT DOCUMENTS

EP 3620810 B1 * 7/2022 ........... G01S 13/343

OTHER PUBLICATIONS

EP-3620810-B1, English Translation (Year: 2022).*

*Primary Examiner* — Ryan D Walsh
(74) *Attorney, Agent, or Firm* — CHRISTENSEN O'CONNOR JOHNSON KINDNESS PLLC (57) ABSTRACT

A wave-based sensor system includes at least one transmitter unit configured to emit waves. The wave-based sensor system further includes at least one receiver unit configured to receive waves and to generate at least one sensor signal corresponding to the received waves. The wave-based sensor system further includes at least one interference detection unit configured to detect interfering waves and to generate at least one interference sensor signal corresponding to the detected interfering waves. The wave-based sensor system further includes a signal processing circuit connected with the at least one receiver unit and the at least one interference detection unit. The signal processing circuit is configured to correct the at least one sensor signal based on the at least one interference sensor signal, thereby obtaining at least one corrected sensor signal. Further, a sensor signal correction method of correcting at least one sensor signal is described.

20 Claims, 2 Drawing Sheets

(51) Int. Cl.
  *G01N 29/06* (2006.01)
  *G01S 7/02* (2006.01)
  *G01S 7/36* (2006.01)
  *G01S 7/40* (2006.01)
  *G01S 7/497* (2006.01)
  *G01S 13/88* (2006.01)
  *G01S 13/89* (2006.01)
  *G01S 17/89* (2020.01)
  *G01V 3/08* (2006.01)
  *G01V 5/20* (2024.01)

(52) U.S. Cl.
  CPC .............. *G01S 7/0235* (2021.05); *G01S 7/36* (2013.01); *G01S 7/4004* (2013.01); *G01S 7/497* (2013.01); *G01S 13/887* (2013.01); *G01S 13/89* (2013.01); *G01S 17/89* (2013.01); *G01V 3/08* (2013.01); *G01V 5/20* (2024.01)

(56) References Cited

U.S. PATENT DOCUMENTS

| | | | | |
|---|---|---|---|---|
| 11,442,142 | B2* | 9/2022 | Papotto | G01S 13/931 |
| 2004/0095269 | A1* | 5/2004 | Uehara | G01S 7/023 |
| | | | | 342/159 |
| 2006/0028369 | A1* | 2/2006 | Rausch | G01S 13/888 |
| | | | | 342/107 |
| 2010/0074365 | A1* | 3/2010 | Ladebeck | G01T 1/1603 |
| | | | | 375/350 |
| 2013/0086664 | A1* | 4/2013 | Conner | H04K 3/226 |
| | | | | 726/7 |
| 2015/0093999 | A1* | 4/2015 | Giardino | H04K 3/65 |
| | | | | 455/71 |
| 2015/0379356 | A1* | 12/2015 | Nikolova | G01S 7/024 |
| | | | | 342/90 |

* cited by examiner

WAVE-BASED SENSOR SYSTEM AND SENSOR SIGNAL CORRECTION METHOD

FIELD OF THE DISCLOSURE

Embodiments of the present disclosure generally relate to a wave-based sensor system. Embodiments of the present disclosure further relate to a sensor signal correction method of correcting at least one sensor signal.

BACKGROUND

Different types of wave-based sensor systems are used in a plurality of different applications.

For example, sound-based sensor systems or electromagnetic waves-based sensor systems may be used in order to examine the integrity of a device under test without dismantling or destroying the device under test.

As another example, electromagnetic wave-based sensor systems may be used in order to screen an object and generate an image of the screened object. In a particular example, such electromagnetic wave-based sensors may be used in security scanners in airports or other security-restricted areas.

Results obtained by means of such wave-based sensor systems may be impaired if disturbances like interfering sound waves or interfering electromagnetic waves are present.

Thus, there is a need for a wave-based sensor systems and a sensor signal correction method that allow to mitigate disturbances.

SUMMARY

Embodiments of the present disclosure provide a wave-based sensor system. In an embodiment, the wave-based sensor system comprises at least one transmitter unit configured to emit waves, at least one receiver unit configured to receive waves and to generate at least one sensor signal corresponding to the received waves. The wave-based sensor system also comprises at least one interference detection unit configured to detect interfering waves and to generate at least one interference sensor signal corresponding to the detected interfering waves. The wave-based sensor system further comprises a signal processing circuit connected with the at least one receiver unit and the at least one interference detection unit. In some embodiments, the signal processing circuit is configured to correct the at least one sensor signal based on the at least one interference sensor signal, thereby obtaining at least one corrected sensor signal.

Therein and in the following, the term "waves" is understood to collectively denote acoustic waves and/or electromagnetic waves.

The wave-based sensor system according to the present disclosure is based on the idea to provide an additional sensor or several additional sensors for detecting the interfering waves, namely the at least one interference detection unit. The at least one interference detection unit allows to detect the presence of interfering waves and to mitigate their influence by correcting the at least one sensor signal based on the at least one interference sensor signal.

Accordingly, results obtained by the wave-based sensor system are corrected for the interfering waves, such that reliable results are obtained in spite of the presence of the interfering waves. In other words, the robustness of the wave-based sensor system according to the present disclosure against disturbances such as external sources of interfering waves is increased.

Moreover, with the wave-based sensor system according to the present disclosure, it is possible to reduce or even omit external shielding means that may be employed in conventional wave-based sensor systems in order to prevent the interfering waves from reaching the at least one receiver unit. Accordingly, the manufacturing costs for the wave-based sensor system according to the present disclosure are reduced.

Moreover, the correction of the at least one sensor signal may be easily adapted by reconfiguring the signal processing circuit, e.g. by applying a software update to the signal processing circuit. Thus, the wave-based sensor system according to the present disclosure can be flexibly utilized in different environments with different sources of interfering waves. In some embodiments, the wave-based sensor system according to the present disclosure can easily be optimized for different environments with different sources of interfering waves.

According to an aspect of the present disclosure, the received waves correspond to, for example, waves emitted by the at least one transmitter unit and reflected at at least one target. In some embodiments, the sensor signal corresponds to the waves emitted by the at least one transmitter unit and reflected at the at least one target, superposed with the interfering waves. Accordingly, the received waves comprise information on a scattering cross section of the at least one target with respect to the emitted waves, which allows to assess the integrity of the at least one target and/or to visualize the at least one target.

For example, the at least one target may be a device under test, an object to be screened, and/or a person to be screened.

In an embodiment of the present disclosure, the at least one transmitter unit and/or the at least one receiver unit are oriented towards a target volume, wherein the at least one interference detection unit is oriented away from the target volume. Accordingly, the at least one interference detection unit is configured to detect interfering waves originating outside of the target volume, such that the at least one sensor signal is corrected for the interfering waves originating outside of the target volume by the signal processing circuit.

According to another aspect of the present disclosure, the wave-based sensor system further comprises, for example, a housing, wherein the housing encloses a target volume at least partially, wherein the at least one receiver unit and the at least one transmitter unit are located inside of the housing, and wherein the at least one interference detection unit is located outside of the housing. Accordingly, the at least one interference detection unit is configured to detect interfering waves originating outside of housing, such that the at least one sensor signal is corrected for the interfering waves originating outside of the housing by the signal processing circuit.

In some embodiments, the housing may be configured to partially shield the target volume from interfering waves. For example, in the case of electromagnetic waves, the housing may at least partially consist of metal. Alternatively or additionally, the housing may comprise absorbers and/or reflectors being configured to prevent the electromagnetic waves from entering the housing. In another example, in the case of acoustic waves, the housing may comprise absorbers and/or reflectors being configured to prevent the acoustic waves from entering the housing.

In a further embodiment of the present disclosure, the housing comprises at least one opening, wherein the at least one interference detection unit is provided adjacent to the at least one opening. The at least one opening may correspond to an opening that is necessary for the functionality of the wave-based sensor system. For example, if the wave-based sensor system is established as a security scanner for persons accessing a restricted area, the at least one opening may correspond to an entrance for a person to walk into the wave-based sensor system or to an exit for a person to walk out of the wave-based sensor system.

Due to the placement of the at least one interference detection unit adjacent to the at least one opening, the at least one interference detection unit in some embodiments is configured to detect interfering waves entering the housing through the at least one opening. Thus, the at least one sensor signal is corrected for the interfering waves originating outside of the housing and entering the housing through the at least one opening.

According to an aspect of the present disclosure, the wave-based sensor system is established, for example, as at least one of a non-destructive test system, a visualization system, or a screening system.

If the wave-based sensor is established as a non-destructive test system, the wave-based sensor system may be configured to assess the integrity of a device under test as described hereinafter. Waves are emitted by the at least one transmitter unit and are reflected at the at least one device under test. The waves reflected at the at least one device under test are received by the at least one receiver unit, thereby obtaining the at least one sensor signal. The at least one sensor signal is corrected by the signal processing circuit, thereby obtaining the at least one corrected sensor signal. The signal processing circuit may be configured to assess the integrity of the device under test based on the corrected sensor signal. Alternatively or additionally, the signal processing circuit may be configured to generate an image of the device under test based on the corrected sensor signal, wherein the image may comprise information on an outer structure and/or an inner structure of the device under test.

If the wave-based sensor is established as a visualization system or as a screening system, the signal processing circuit may be configured to generate an image of at least one target hit by the emitted waves based on the corrected sensor signal. The image May comprise information on an inner structure of the at least one target and/or on an outer structure of the at least one target.

If the wave-based sensor is established as a screening system, the at least one target may be a human or a piece of luggage that is to be searched for forbidden objects. For example, the wave-based sensor system may employ electromagnetic waves in a particular frequency spectrum, such that the electromagnetic waves penetrate clothing. For example, the electromagnetic waves may be in the spectrum between 10 GHz and 100 GHz.

The signal processing circuit may be configured to reconstruct a propagation path of the interfering waves based on the at least one interference sensor signal. This is particularly advantageous if the wave-based sensor system comprises at least two receiver units. Based on the reconstructed propagation path, the signal processing circuit may be configured to selectively correct sensor signals generated by the at least two receiver units. In other words, different corrections may be applied to different sensor signals based on the reconstructed propagation path.

Alternatively or additionally, the signal processing circuit may be configured to determine a position of a source of the interfering waves based on the reconstructed propagation path. This allows to purposefully deploy countermeasures in order to mitigate the influence of the source, e.g. by placing additional shielding means between the source and the receiver units.

In an embodiment of the present disclosure, the signal processing circuit is configured to correct the at least one sensor signal based on the reconstructed propagation path. For example, the signal processing circuit may be configured to determine an amplitude and/or a phase of the interfering waves at the at least one receiver unit based on the reconstructed propagation path, and may correct the at least one sensor signal based on amplitude and/or the phase of the interfering waves at the at least one receiver unit.

In some embodiments, the signal processing circuit is configured to determine at least one power parameter based on the interference sensor signal, wherein the at least one power parameter is indicative of a power level of the interfering waves detected. For example, the at least one sensor signal may be corrected based on the at least one power parameter.

In some embodiments, the at least one power parameter may comprise a power density of the interfering waves in frequency domain.

According to another aspect of the present disclosure, the signal processing circuit is configured, for example, to compare the at least one power parameter with at least one predetermined threshold. The at least one threshold may correspond to a threshold, under which measurements can be conducted by the wave-based sensor system with or without correcting for the interfering waves.

In a further embodiment of the present disclosure, the signal processing circuit is configured to reschedule measurements conducted by the wave-based sensor system in time domain and/or in frequency domain if the at least one power parameter is larger than the at least one predetermined threshold. In other words, the measurements may be repeated at a different time, e.g. at a time at which the at least one power parameter is smaller than the at least one predetermined threshold. Alternatively or additionally, the measurements may be repeated with a different frequency band of the emitted waves, e.g. in a frequency band being different from frequency bands populated by the interfering waves.

The signal processing circuit may be configured to generate a warning message if the at least one power parameter is larger than the at least one predetermined threshold. Thus, an operator of the wave-based sensor system is automatically alarmed if the power level of the interfering waves causes significant disturbances of the measurements conducted by the wave-based sensor system.

In some embodiments, the warning message may comprise at least one of a text message, a warning sign, a color-coded text message, a color-coded sign, a warning sound, or a sequence of warning sounds.

According to an aspect of the present disclosure, the emitted waves, the received waves, and the interference waves are, for example, acoustic waves, respectively. The acoustic waves may be infrasonic waves, sound waves in the audible spectrum, and/or ultrasonic waves. In general, the frequency of the acoustic waves depends on an application of the wave-based sensor system.

Another aspect of the present disclosure provides, for example, that the emitted waves, the received waves, and the interference waves are electromagnetic waves, respectively. In general, the frequency of the electromagnetic waves depends on an application of the wave-based sensor system.

According to another aspect of the present disclosure, the electromagnetic waves are, for example, at least one of radio frequency waves, microwaves, infrared waves, visible light waves, or ultraviolet waves. In a particular example, the electromagnetic waves may be in the frequency band between 10 GHz and 100 GHz.

In a further embodiment of the present disclosure, the signal processing circuit is configured to correct the at least one sensor signal based on calibration data. The calibration data may be obtained during a calibration of the wave-based sensor system, wherein known sources of interfering waves may be applied to the wave-based sensor system.

In some embodiments, the at least one interference detection unit is constructed identically to the at least one receiver unit. In other words, the same type of receiver unit may be used for receiving the waves and for detecting the interfering waves.

However, it is to be understood that the at least one interference detection unit may differ from the at least one receiver unit by count (i.e. different number of interference detection units and receiver units may be provided), by a signal acquisition scheme, or by any other wave characteristic, for example by any other electromagnetic characteristic.

Embodiments of the present disclosure further provide a sensor signal correction method of correcting at least one sensor signal. In an embodiment, the sensor signal correction method comprises the steps of: emitting waves by at least one emitter unit, receiving, by at least one receiver unit, waves reflected at at least one target, generating, by the at least one receiver unit, at least one sensor signal corresponding to the received waves, detecting, by at least one interference detection unit, interfering waves, generating, by the at least one interference detection unit, at least one interference sensor signal corresponding to the detected interfering waves, and correcting, by a signal processing circuit, the at least one sensor signal based on the at least one interference sensor signal, thereby obtaining at least one corrected sensor signal.

In some embodiments, the wave-based sensor system described above is configured to perform the sensor signal correction method of correcting at least one sensor signal.

Regarding the further advantages and properties of the sensor signal correction method, reference is made to the explanations given above with respect to the wave-based sensor system, which also hold for the sensor signal correction method and vice versa.

In an embodiment of the present disclosure, at least one of the at least one sensor signal, the at least one corrected sensor signal, or the at least one interference sensor signal is visualized on a display. Thus, information on the at least one sensor signal, the at least one corrected sensor signal, and/or the at least one interference sensor signal is presented to an operator in an illustrative way.

In a further embodiment of the present disclosure, a source of the interfering waves is determined based on the at least one interference sensor signal. For example, the type of the source may be determined, e.g. whether the source is a mobile phone or WLAN router. Alternatively or additionally, a position of the source may be determined.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
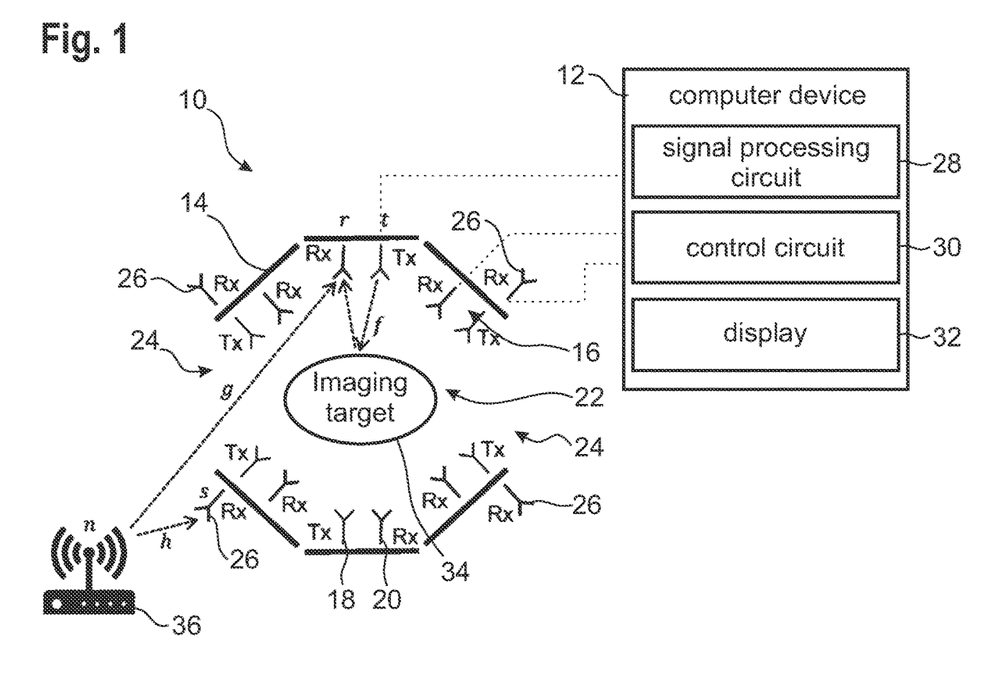
FIG. 1 schematically shows a wave-based sensor system according to an embodiment of the present disclosure.

FIG. 1 schematically shows a wave-based sensor system 10 comprising a computer device 12 and a housing 14 with a sensor array 16. In general, the wave-based sensor system 10 may be established as at least one of a non-destructive test system, a visualization system, or a screening system.

In some embodiments, the wave-based sensor system 10 may be configured to utilize acoustic waves, such as infrasonic waves, sound waves in the audible spectrum, and/or ultrasonic waves. Alternatively, the wave-based sensor system 10 may be configured to utilize electromagnetic waves, such as radio frequency waves, microwaves, infrared waves, visible light waves, or ultraviolet waves.

In the following, the term "waves" is understood to collectively denote acoustic waves and electromagnetic waves.

The sensor array 16 comprises a plurality of transmitter units 18 that are configured to emit waves, respectively. In the particular example shown in FIG. 1, the transmitter units 18 are established as an antenna being configured to emit electromagnetic waves, respectively.

Depending on the type of waves utilized by the wave-based sensor system 10, the transmitter units 18 may be established as a speaker, for example as an ultrasonic speaker such as a ultrasonic piezo speaker, as a laser, or as another type of coherent light source, respectively.

The sensor array 16 further comprises a plurality of receiver units 20 that are configured to receive waves, respectively. In the particular example shown in FIG. 1, the receiver units 20 are established as an antenna being configured to receive electromagnetic waves, respectively.

Depending on the type of waves utilized by the wave-based sensor system 10, the receiver units 20 may be established as a microphone, as an ultrasonic sensor, or as a photosensor, respectively.

In some embodiments, the sensor array 16 is provided on an inside of the housing 14, i.e. the transmitter units 18 and the receiver units 20 are provided on the inside of the housing 14. Therein, the transmitter units 18 and the receiver units are each oriented towards a target volume 22 confined by the housing 14. The housing may comprise at least one opening 24.

In a certain example shown in FIG. 1, the housing 14 comprises two openings 24, wherein one of the openings 24 corresponds to an entrance for a person walking into the wave-based sensor system 10, and wherein the other one of the openings 24 corresponds to an exit for a person walking out of the wave-based sensor system 10.

As another example, the at least one opening 24 may be utilized in order to place a device under test into the target volume 22 and/or in order to remove a device under test from the target volume 22.

The wave-based sensor system further comprises a plurality of interference detection units 26. The interference detection units 26 are provided on an outside of the housing 14, for example adjacent to the at least one opening 24. Therein, the interference detection units 26 are oriented away from the target volume 22.

In the particular example shown in FIG. 1, the interference detection units 26 are established as an antenna being configured to receive electromagnetic waves, respectively.

Depending on the type of waves utilized by the wave-based sensor system 10, the interference detection units 26 may be established as a microphone, as an ultrasonic sensor, or as a photosensor, respectively.

In some embodiments, the interference detection units 26 may be constructed identically to the receiver units 20. However, it is to be understood that the interference detection units 26 may differ from the receiver units 20 by count (i.e. different number of interference detection units 26 and receiver units 20 may be provided), by a signal acquisition scheme, or by any other wave characteristic, for example by any other electromagnetic characteristic.

The computer device 12 may be established as any suitable device being configured to perform the functionality described hereinafter. For example, the computer device 12 may be a personal computer, a laptop, a tablet, a smartphone, or any other suitable type of smart device.

The computer device 12 comprises a signal processing circuit 28, a control circuit 30, and a display 32. The functionality of the signal processing circuit 28, of the control circuit 30, and of the display 32 will be described in more detail below.

As is indicated by the dashed lines in FIG. 1, the computer device 12 is connected with the transmitter units 18, the receiver units 20, and the interference detection units 26, respectively. It is noted that not all connections are explicitly illustrated in FIG. 1 for better legibility. However, it is to be understood that each of the transmitter units 18, each of the receiver units 20, and each of the interference detection units 26 may be connected with the computer device 12.

Figure 2:
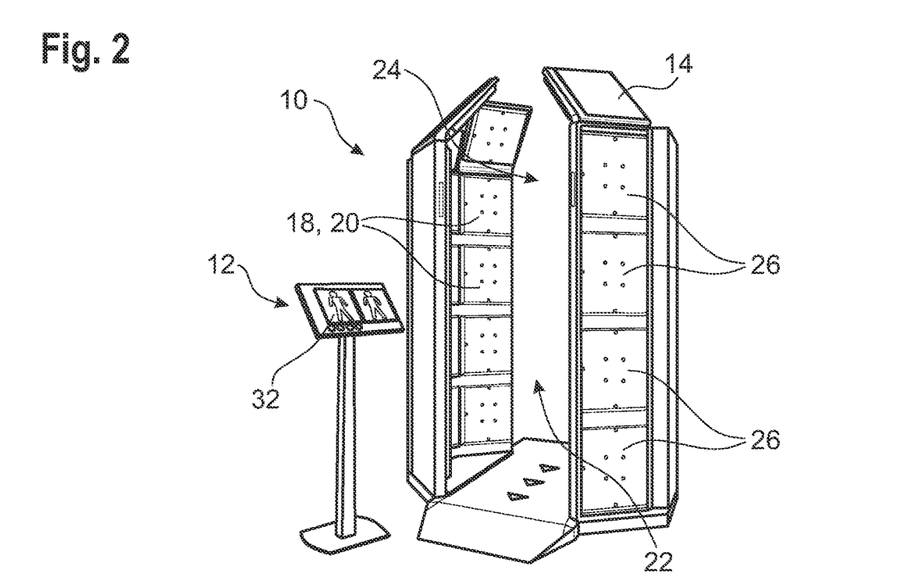
FIG. 2 shows a perspective view of a representative embodiment of the wave-based sensor system of FIG. 1.

FIG. 2 shows a perspective view of a representative embodiment of the wave-based sensor system 10. In this embodiment, the wave-based sensor system is established as a body scanner utilizing electromagnetic waves in the gigahertz range (e.g. in the range between 10 GHz and 100 GHz) in order to detect restricted items carried by a person. Such scanners are, for example, used as a security measure in airports or in other areas with restricted access.

The wave-based sensor system 10 is configured to perform a sensor signal correction method of correcting sensor signals. The sensor signal correction method is described hereinafter with reference to FIGS. 1 and 3. Without restriction of generality, the sensor signal correction method is described with reference to the body scanner shown in FIG. 2. However, it is to be understood that the explanations given hereinafter likewise apply to other types of wave-based sensor systems.

Figure 3:
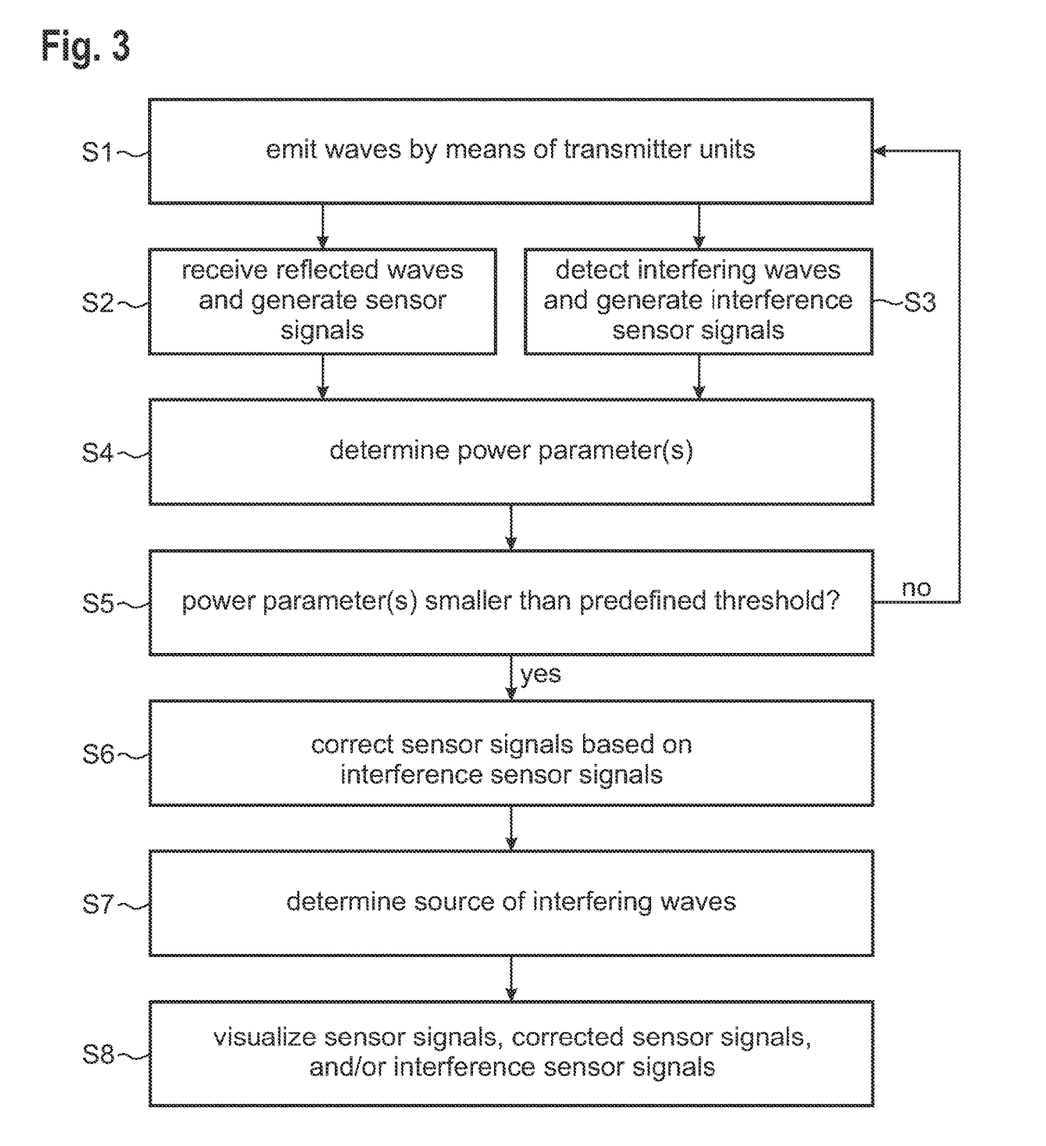
FIG. 3 shows a flow chart of a sensor signal correction method according to an embodiment of the present disclosure.

Waves are emitted by the transmitter units 18 (step S1).

Therein, the control circuit 30 may control the transmitter units 18 to emit the waves. The waves are reflected off at least one target 34 in the target volume 22, which is indicated by the signal path "f" in FIG. 1. Accordingly, the reflected waves comprise information on a scattering cross section of the at least one target 34.

The reflected waves are received by the receiver units 20, wherein sensor signals corresponding to the received waves are generated by the receiver units 20 (step S2).

The generated sensor signals are forwarded to the signal processing circuit 28.

Interfering waves are detected by the interference detection units 26, wherein interference sensor signals corresponding to the received interference waves are generated by the interference detection units 26 (step S3).

As is illustrated in FIG. 1, the interfering waves are generated by a source 36 being located outside of the housing 14. For example, the source 36 may be a mobile phone, a WLAN router or an electromagnetic jammer being configured to purposefully emit the interfering waves.

The generated interference sensor signals are forwarded to the signal processing circuit 28.

Optionally, at least one power parameter is determined by the signal processing circuit 28 based on the interference sensor signals (step S4).

The at least one power parameter is indicative of a power level of the interfering waves detected. For example, the at least one power parameter may comprise a power density of the interfering waves in frequency domain.

Optionally, the at least one power parameter may be compared with at least one predetermined threshold (step S5).

The at least one predetermined threshold may correspond to a threshold, under which measurements can be conducted by the wave-based sensor system 10 with or without correcting for the interfering waves.

If the at least one power parameter is larger than the at least one predetermined threshold, the measurements conducted by means of wave-based sensor system 10 may be rescheduled in time domain and/or in frequency domain.

In other words, steps S1 to S5 described above be repeated at a different time, e.g. at a time at which the at least one power parameter is smaller than the at least one predetermined threshold.

Alternatively or additionally, steps S1 to S5 described above may be repeated with a different frequency band of the emitted waves, e.g. in a frequency band being different from frequency bands populated by the interfering waves.

Alternatively or additionally, a warning message may be generated by the signal processing circuit 28 and may be displayed on the display 32 if the at least one power parameter is larger than the at least one predetermined threshold.

If the at least one power parameter is smaller than the at least one predetermined threshold, the steps described hereinafter may be performed.

The sensor signals are corrected by the signal processing circuit 28 based on the interference sensor signals (step S6).

In general, the signal processing circuit 28 may employ any suitable algorithm in order to correct the sensor signals based on the interference sensor signals. For example, the algorithm may be based on transfer functions between the transmitter units 18 and the receiver units 20, as well as transfer functions from the source 36 to the receiver units 20.

This approach is representatively illustrated in FIG. 1 for a single transmitter unit 18, a single receiver unit 20, and a single interference detection unit 26.

The transfer function from the transmitter unit 18 to the receiver unit 20 is denoted by "f". The transfer function from the source 36 to the receiver unit 20 is denoted by "g", and the transfer function form the source 36 to the interference detection unit 26 is denoted by "h". Moreover, t denotes a transmitted signal, i.e. the emitted waves, r denotes the received waves, n denotes the undesired interference waves, and s denotes the interference sensor signal.

If no interfering waves were present, the received signal would be given by r=f(t). In the presence of the interfering waves n, the received signal corresponds to a superposition of the waves reflected at the at least one target 34 and of the interfering waves, i.e. r=f(t)+g(n).

Using the interference sensor signal s, the sensor signal can be corrected according to the equation: r=f(t)+g(n)−(h^(−1)°g)(s)≈f(t).

Therein, the inverse transfer function h^(−1) may not have to be determined explicitly. Instead, statistical methods may be used utilizing that the transfer functions are statistically correlated with each other and utilizing a plurality of interference sensor signals obtained by the interference detection units 26.

Alternatively or additionally, the signal processing circuit 28 may correct the sensor signals based on calibration data.

The calibration data may be obtained during a calibration of the wave-based sensor system 10, wherein known sources of interfering waves may be applied to the wave-based sensor system 10 during the calibration.

Alternatively or additionally, the signal processing circuit 28 may correct the sensor signals based on the at least one power parameter determined.

Alternatively or additionally, propagation paths of the interfering waves may be reconstructed based on the at least one interference sensor signal.

Based on the reconstructed propagation path, the sensor signals may be selectively corrected. In other words, different corrections may be applied to different sensor signals generated by different receiver units 20 based on the reconstructed propagation path.

For example, the amplitudes and/or a phases of the interfering waves at the respective receiver units 20 may be determined based on the reconstructed propagation paths. The sensor signals may be corrected based on the amplitudes and/or the phases of the interfering waves at the respective receiver units 20.

Optionally, the source 36 of the interfering waves may be determined based on the at least one interference sensor signal, for example based on the reconstructed propagation paths (step S7).

For example, the type of the source 36 may be determined, e.g. whether the source 36 is a mobile phone or WLAN router. For example, the signal processing circuit 28 may determine a frequency spectrum of the interference sensors signals and may determine the type of the source 36 based on the frequency spectrum determined.

Alternatively or additionally, a position of the source 36 may be determined, for example based on the reconstructed propagation paths.

The sensor signals, the corrected sensor signals and/or the interference sensor signals are visualized on the display 32 (step S8).

Accordingly, an image of the at least one target 34 may be displayed on the display.

Alternatively or additionally, information on the interfering waves may be displayed on the display, e.g. the at least one power parameter, the type of the source 36 and/or the position of the source 36.

Certain embodiments disclosed herein include components that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In certain embodiments, the functionality described herein regarding, for example, the computer device 12, the interference detection units 26, the signal processing circuit 28, the control circuit 30, the display 32, etc., can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately." "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C." for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A wave-based sensor system, the wave-based sensor system comprising
   at least one transmitter unit, the at least one transmitter unit being configured to emit waves;
   at least one receiver unit, the at least one receiver unit being configured to receive waves, the at least one receiver unit further being configured to generate at least one sensor signal corresponding to the received waves;
   at least one interference detection unit, the at least one interference detection unit being configured to detect interfering waves, the at least one interference detection unit further being configured to generate at least one interference sensor signal corresponding to the detected interfering waves; and
   a signal processing circuit, the signal processing circuit being connected with the at least one receiver unit and the at least one interference detection unit;
   wherein the signal processing circuit is configured to correct the at least one sensor signal based on the at least one interference sensor signal, thereby obtaining at least one corrected sensor signal.

2. The wave-based sensor system of claim 1, wherein the received waves correspond to waves emitted by the at least one transmitter unit and reflected at at least one target.

3. The wave-based sensor system of claim 1, wherein the at least one transmitter unit and/or the at least one receiver unit are oriented towards a target volume, and wherein the at least one interference detection unit is oriented away from the target volume.

4. The wave-based sensor system of claim 1, further comprising a housing, wherein the housing encloses a target volume at least partially, wherein the at least one receiver unit and the at least one transmitter unit are located inside of the housing, and wherein the at least one interference detection unit is located outside of the housing.

5. The wave-based sensor system of claim 4, wherein the housing comprises at least one opening, and wherein the at least one interference detection unit is provided adjacent to the at least one opening.

6. The wave-based sensor system of claim 1, wherein the wave-based sensor system is established as at least one of a non-destructive test system, a visualization system, or a screening system.

7. The wave-based sensor system of claim 1, wherein the signal processing circuit is configured to reconstruct a propagation path of the interfering waves based on the at least one interference sensor signal.

8. The wave-based sensor system of claim 7, wherein the signal processing circuit is configured to correct the at least one sensor signal based on the reconstructed propagation path.

9. The wave-based sensor system of claim 1, wherein the signal processing circuit is configured to determine at least one power parameter based on the interference sensor signal, wherein the at least one power parameter is indicative of a power level of the interfering waves detected.

10. The wave-based sensor system of claim 9, wherein the signal processing circuit is configured to compare the at least one power parameter with at least one predetermined threshold.

11. The wave-based sensor system of claim 10, wherein the signal processing circuit is configured to reschedule measurements conducted by means of wave-based sensor system in time domain and/or in frequency domain if the at least one power parameter is larger than the at least one predetermined threshold.

12. The wave-based sensor system of claim 10, wherein the signal processing circuit is configured to generate a warning message if the at least one power parameter is larger than the at least one predetermined threshold.

13. The wave-based sensor system of claim 1, wherein the emitted waves, the received waves, and the interference waves are acoustic waves, respectively.

14. The wave-based sensor system of claim 1, wherein the emitted waves, the received waves, and the interference waves are electromagnetic waves, respectively.

15. The wave-based sensor system of claim 14, wherein the electromagnetic waves are at least one of radio frequency waves, microwaves, infrared waves, visible light waves, or ultraviolet waves.

16. The wave-based sensor system of claim 1, wherein the signal processing circuit is configured to correct the at least one sensor signal based on calibration data.

17. The wave-based sensor system of claim 1, wherein the at least one interference detection unit is constructed identically to the at least one receiver unit.

18. A sensor signal correction method of correcting at least one sensor signal, the sensor signal correction method comprising the steps of:
   emitting waves by at least one emitter unit;
   receiving, by at least one receiver unit, waves reflected at at least one target;
   generating, by the at least one receiver unit, at least one sensor signal corresponding to the received waves;
   detecting, by at least one interference detection unit, interfering waves;
   generating, by the at least one interference detection unit, at least one interference sensor signal corresponding to the detected interfering waves; and correcting, by a signal processing circuit, the at least one sensor signal based on the at least one interference sensor signal, thereby obtaining at least one corrected sensor signal.

19. The sensor signal correction method of claim 18, wherein at least one of the at least one sensor signal, the at least one corrected sensor signal, or the at least one interference sensor signal is visualized on a display.

20. The sensor signal correction method of claim 18, wherein a source of the interfering waves is determined based on the at least one interference sensor signal.

* * * * *